E. M. Smith.
Harvester Rake.
Nº 79,507. Patented Jun. 30, 1868.
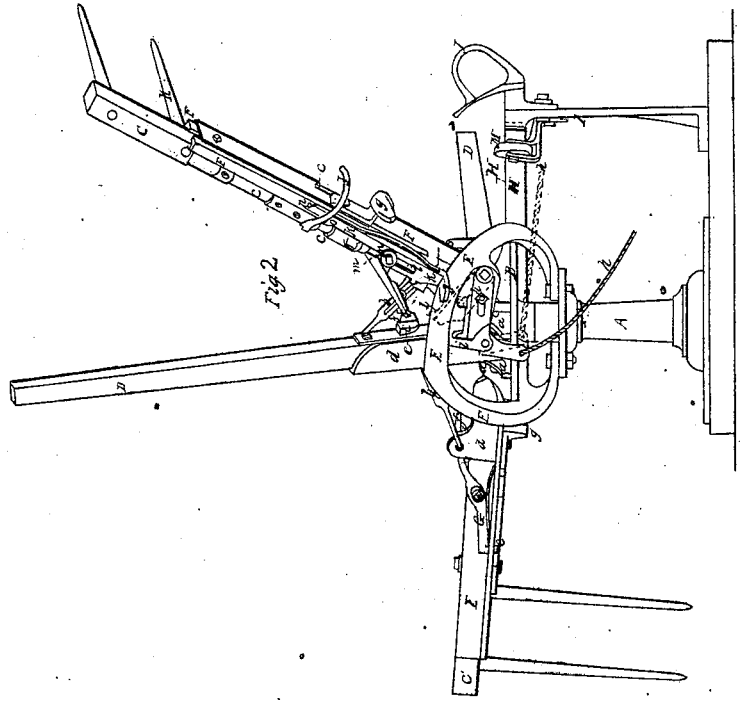
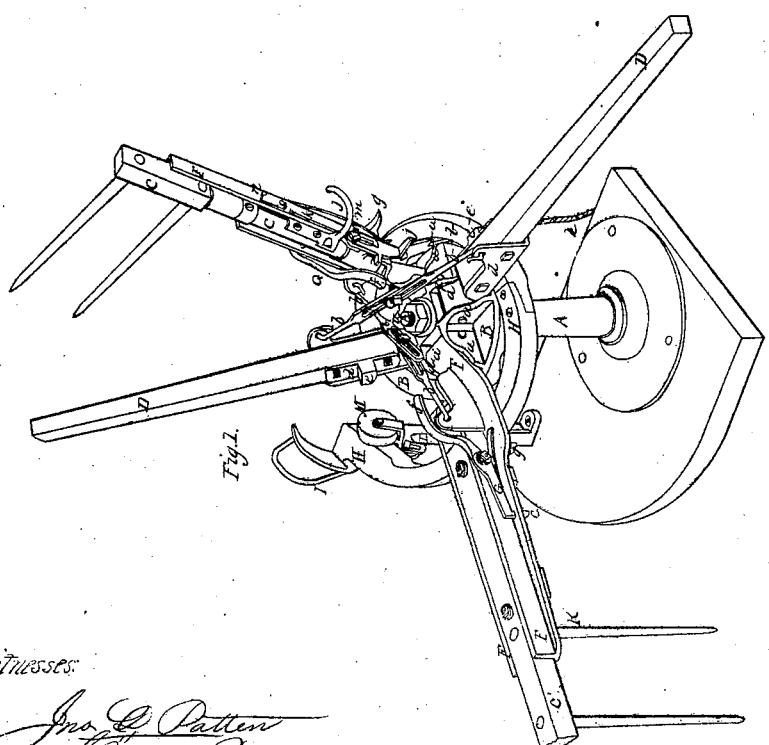
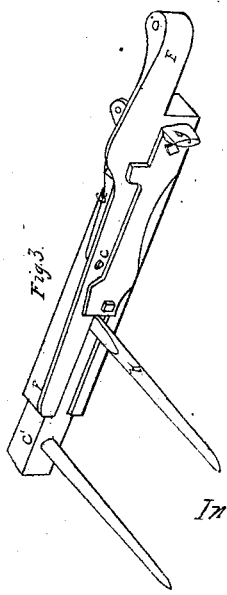
Witnesses:
Jno. C. Patten
J. Morris Pool
Inventor:
Edgar M. Smith
By atty. A. B. Stoughton

United States Patent Office.

EDGAR M. SMITH, OF NEW YORK, N. Y., ASSIGNOR TO MITCHELL, VANCE, AND COMPANY, OF SAME PLACE.

Letters Patent No. 79,507, dated June 30, 1868.

---

IMPROVEMENT IN HARVESTER-RAKES.

---

The Schedule referred to in these Letters Patent and making part of the same.

---

TO ALL WHOM IT MAY CONCERN:

Be it known that I, EDGAR M. SMITH, of the city, county, and State of New York, have invented certain new and useful Improvements in Combined Rakes and Beaters for Harvesting-Machines; and I do hereby declare the following to be a full, clear, and exact description of the same, reference being had to the accompanying drawings, making a part of this specification, in which—

Figure 1 represents, in perspective, so much of a combined rake and beater as will illustrate the invention.

Figure 2 represents an elevation of the same, and

Figure 3 represents a portion of the apparatus as detached, to better represent it and its connections.

Similar letters of reference, where they occur in the separate figures, denote like parts of the mechanism in all of the drawings.

My invention relates to that class of rakes and beaters which perform all the duties of a reel and a raking apparatus, the rakes being rakes or beaters as the operator may desire, or the quality of the grain demand, while the beaters enter and bear the standing grain up to and against the action of the cutters; and my invention consists, first, in the manner of elongating and then shortening the rakes, so that they may sweep a platform that is not merely an arc of a circle, but much longer or greater in extent than such, and deliver the grain behind the machine; and my invention further consists in the manner in which I cause the rakes to roll in their bearings to pass the wheel on that side, and to put themselves in position to act as beaters, or to roll back and become rakes to clear the platform, as the operator, by or through a trip-mechanism that he can move or not, may desire.

To enable those skilled in the art to make and use my invention, I will proceed to describe the same with reference to the drawings.

A represents a post, column, or frame, on which the rakes and beaters are supported, and upon which they are revolved by any suitable driving-mechanism connecting the rake-plate B with the driving-wheels of a harvesting-machine.

To suitable lugs, $a\ a$, upon the rake-plate B, are pivoted the rakes $c\ c'$ and the beaters D D, and the rakes and beaters being in pairs, and hung at diametrically opposite points on the revolving plate B, they are linked together by adjustable links $b\ b$, so that the falling of one may aid in raising its mate or fellow, and so that the descending one of the pair can fall no faster or no harder than its mate climbs the cam in rising, thus making an equalizing or compensating movement.

The beaters D are made of wood or any other light and strong material, and are set and secured in metal bearings, $d$, upon which there is a projection, $e$, to trip the rakes and allow them to run back or shorten after they have been elongated to sweep an irregular-shaped platform. As these beaters have a continuous rotation, and rise and fall in every rotation by passing over the cam-shaped ledge E, no further description of them need be made.

The rakes, however, have several motions or functions, which will be described.

In the first place, the rake-stales $c\ c'$ have a longitudinal sliding motion in their metallic heads F, which motion is controlled by a spring-catch, G, the bolt $c$ of which takes into holes or against shoulders on the sliding portions of said rakes, to lock and release them, as the case may be. The tail-ends, $f$, of the spring-catches G, when they come against the projections $e$ on the beater-holder, throw or draw out the bolts $c$, and as this contact takes place when the rake is in quite a vertical position, as shown in fig. 2, the rake-stale slides back into its socket or bearing-plates, F, by its own weight or gravity, but is run out positively by a projection, $g$, on the sliding portion taking against the exterior of a cam-rail, H, which is secured to the post A, and extends therefrom around to another support, I, to which it is secured at that end. The rake $c'$ has but this longitudinal sliding and its rising and falling motion as it rides over the cams E H; but the rake $c$, in addition to its elongating and rising falling motion, and its dropping back or shortening, has a rolling motion to and fro around its stale-bearing, which rolling motion is controlled by the driver at his will, who, by drawing or pulling the cord $h$, throws up a trigger or tripper, $i$, as shown by red lines in fig. 2, and when this tripper $i$ is thus thrown up, it catches against the bent end $j$ of a pushing-lever, $k$, that has a slot, $l$, and pin, $m$, that allows it an endwise movement, and a pin, $n$, in the piece F', at the forward end of this pusher, throws up that end of the pusher against a bent arm, J, that is on the rake-stale $c$, and the pusher continuing its motion, its catch $o$ takes the bent arm and rake-stale, and moving it outward until its rearmost finger K has passed beyond the plate F, when, there being nothing more to hold the rake, its teeth drop downward by the rolling of the rake-stale in its bearings; and just when this rolling or turning motion has taken place, then the tail-end, $f$, of the spring-bolt G, strikes against the projection $e$, and the rake runs back in its plates or bearings F, and it is in position for raking off the platform on its round, and when it arrives at the point where the grain is delivered upon the ground, and after the delivery, the rake is moved slightly outward, so that it can roll in its bearings, (this being prevented during the sweeping off of the platform,) and the bent arm J, striking against the stationary cam-plane L, turns the rake a quarter round, so that its teeth will be horizontal, and the back of the rake towards the standing grain. If, now, the tripper $i$ is allowed to fall, so as not to touch the bent end $j$ of the pusher $k$, then this rake will go around in this position, and act as a beater, and continue so to act until the driver or operator throws up the trigger, and when that is done, and so long as it is up, (and it may be fastened up by the set-screw $p$,) so long this part of the machine will be a rake, so that it is a rake for clearing the platform or a beater for bringing in the grain to the cutters, whichever the operator desires; and, though I have only described one of these instruments, viz, that one, $c$, as being thus a rake or a beater, it is obvious that the other one, $c'$, could be similarly arranged and operated, if so desired.

Just before the rear portions of the rakes strike the stationary cam E to ride upon it, they come against a friction-roller, M, adjustably set upon or against the cam-rail H, and this roller starts the rakes upward gently, and avoids the jar that would be incident to their coming first against the stationary cam-plane E.

There are some other slight details of the mechanism, but as they are clearly shown in the drawings, further description is not regarded as essential.

Having thus fully described my invention, what I claim therein as new, and desire to secure by Letters Patent, is—

1. In revolving rising, falling, and rolling rakes, the elongating and shortening of said rakes, by sliding them in their bearings, so that they will sweep an irregular-shaped platform, substantially as described.

2. I also claim locking and unlocking and moving of the rakes out and in by devices, substantially as herein described, that are self-acting, and require no attention on the part of the operator, substantially as described.

3. I also claim the combination of the trigger $i$ and sliding lever $k$, for moving the rake out, so that it can roll in its bearings, and thus become a rake instead of a beater at the will of the operator, substantially as described.

EDGAR M. SMITH.

Witnesses:
EDWARD KAYSEL,
S. LASAR.